March 10, 1931. W. J. MILLER 1,795,665
TAKE-OUT FOR GLASS FABRICATING MACHINES
Filed April 26, 1926 4 Sheets-Sheet 2
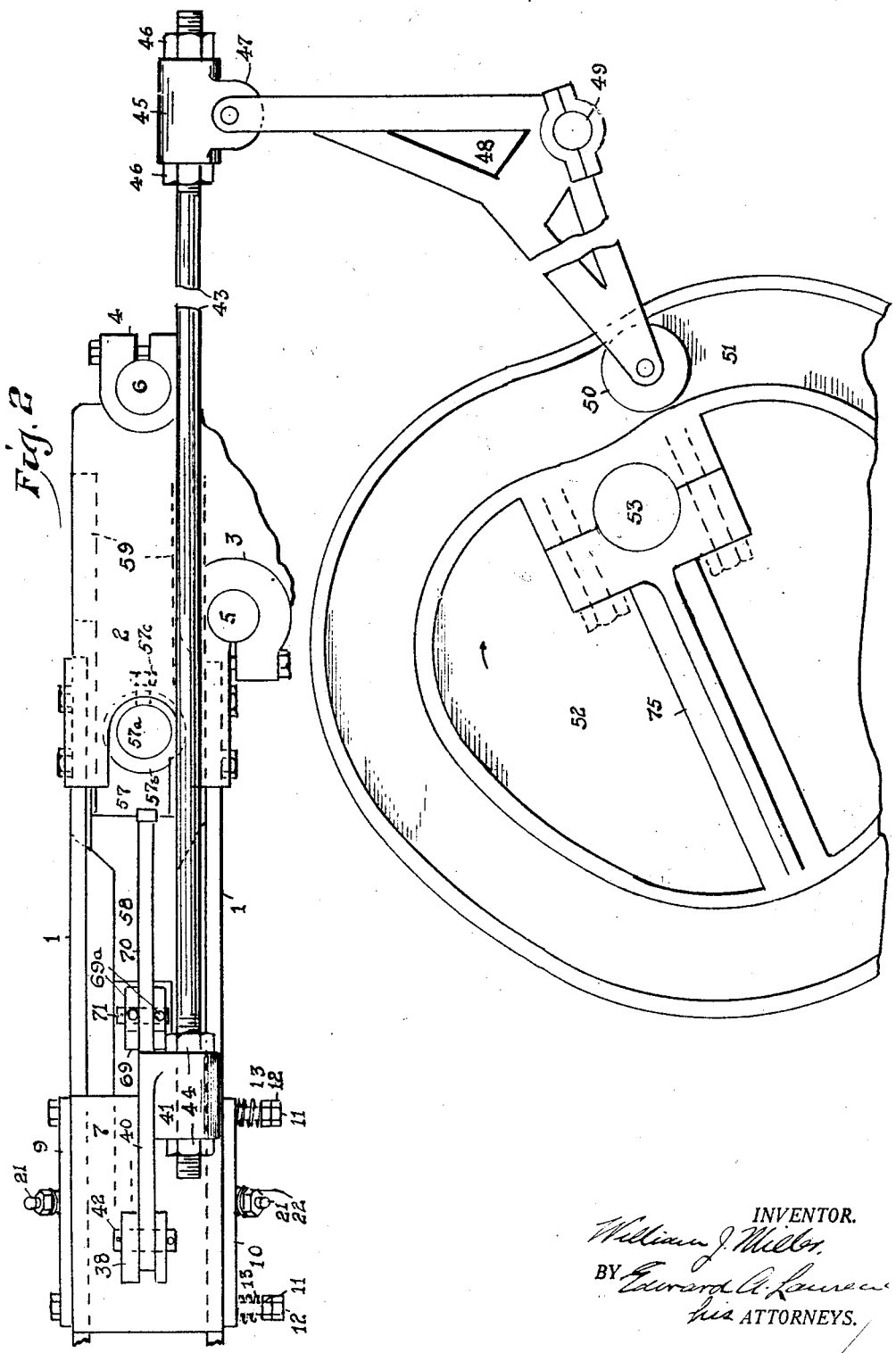
INVENTOR.
William J. Miller
BY Edward A. Lawrence
his ATTORNEYS.

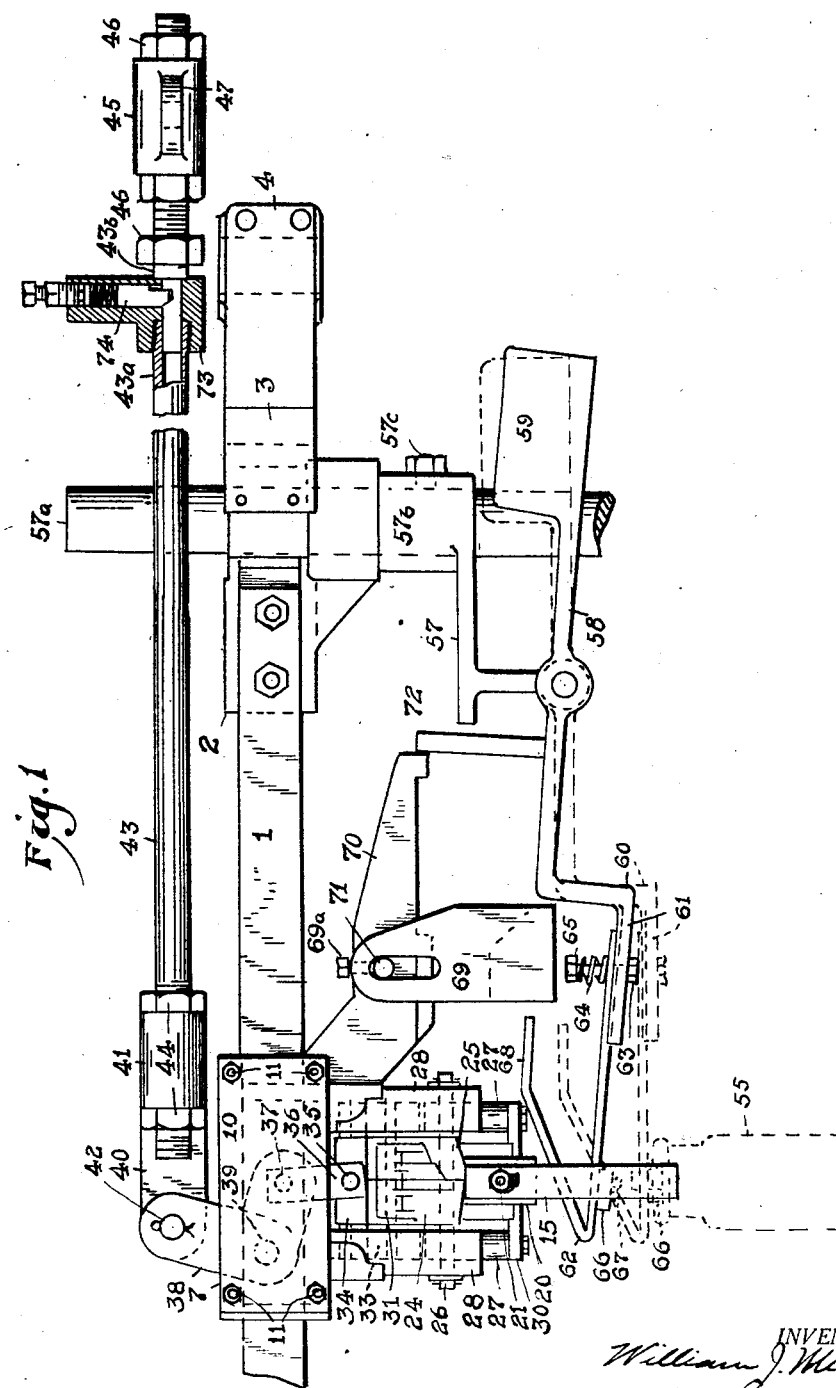

March 10, 1931. W. J. MILLER 1,795,665
TAKE-OUT FOR GLASS FABRICATING MACHINES
Filed April 26, 1926 4 Sheets-Sheet 3
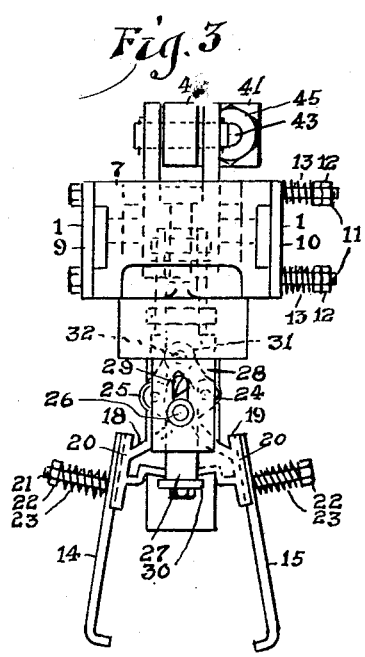
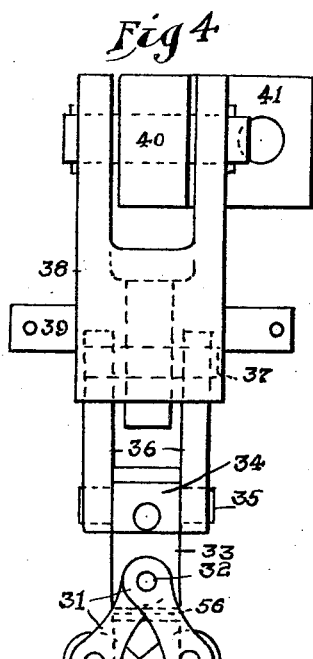
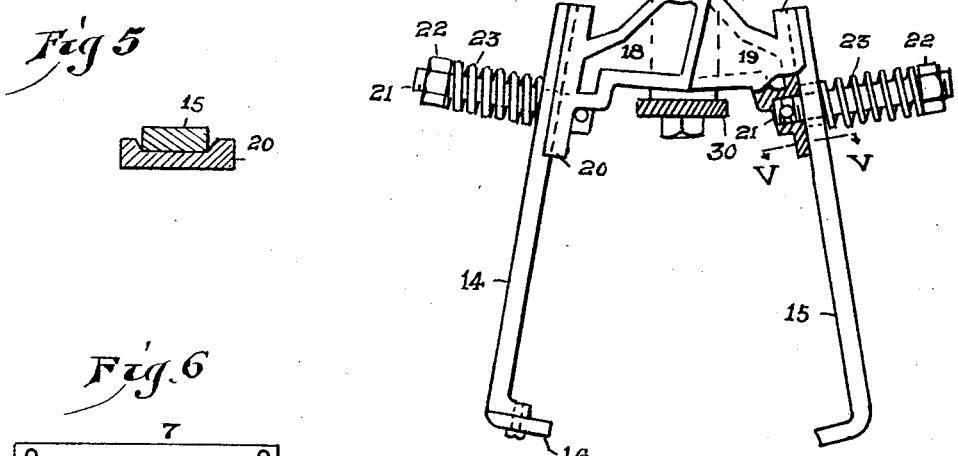
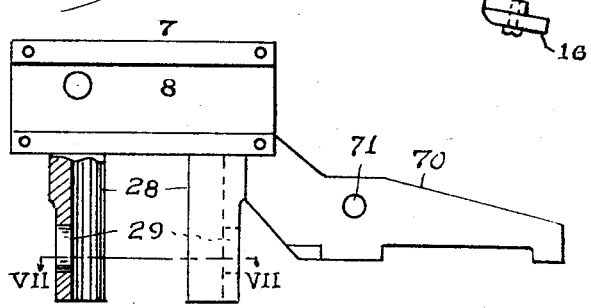
INVENTOR.
William J. Miller
BY Edward A. Lawrence
his ATTORNEYS.

March 10, 1931. W. J. MILLER 1,795,665
TAKE-OUT FOR GLASS FABRICATING MACHINES
Filed April 26, 1926 4 Sheets-Sheet 4
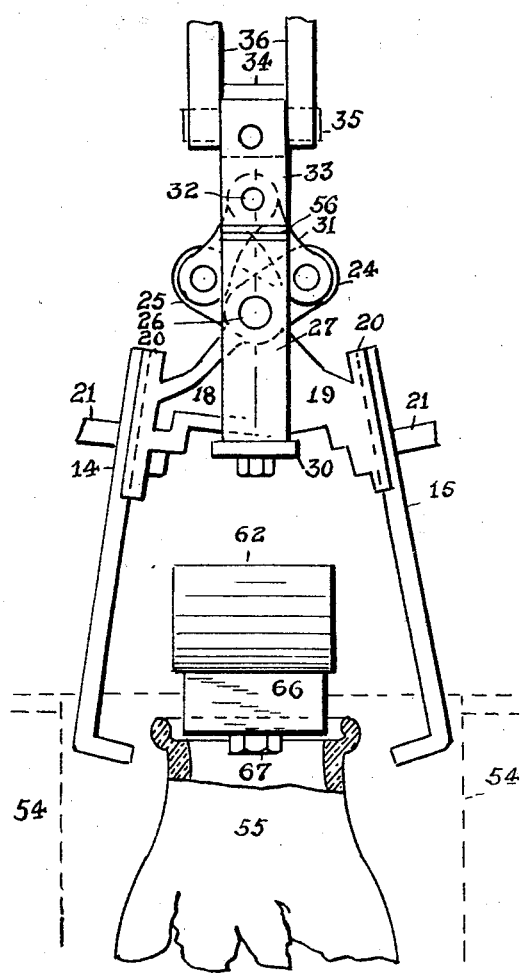
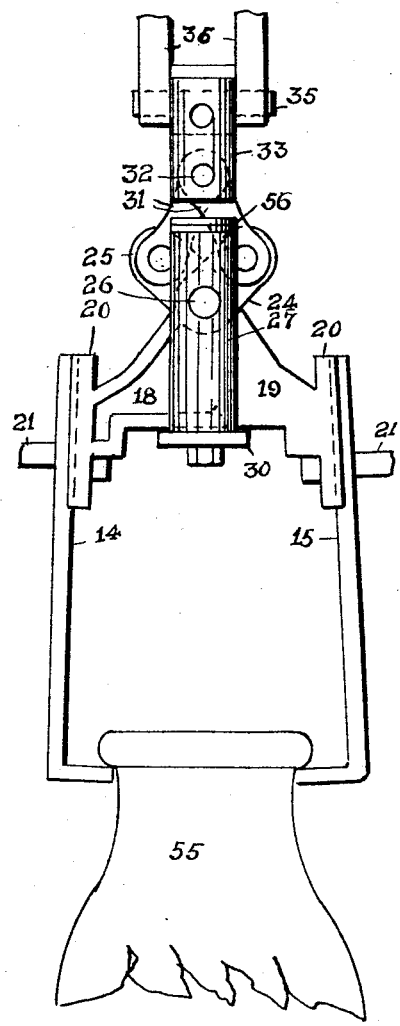
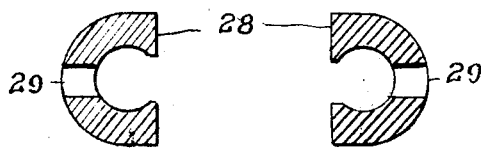
INVENTOR.
William J. Miller.
BY Edward A. Laurence,
his ATTORNEY Patented Mar. 10, 1931

1,795,665

UNITED STATES PATENT OFFICE

WILLIAM J. MILLER, OF SWISSVALE BOROUGH, PENNSYLVANIA, ASSIGNOR TO WILLIAM J. MILLER, INC., OF SWISSVALE, PENNSYLVANIA, A CORPORATION OF DELAWARE

TAKE-OUT FOR GLASS-FABRICATING MACHINES

Application filed April 26, 1926. Serial No. 104,693.

The subject matter hereof relates to mechanism employed for removing the finished ware from the molds of a glass fabricating machine.

In the accompanying drawings, wherein I illustrate the best embodiment of the principles of my invention now known to me, Fig. 1 is a side elevation of the take-off and some of the associated parts, the jaws being shown grasping the article and the centering device being shown in dotted lines in its operative position and in solid lines in its retracted or inoperative position; Fig. 2 is a plan view showing the actuating mechanism of the take-out; Fig. 3 is an enlarged detail showing the take-out jaws and their carriage; Fig. 4 is a view on still larger scale showing the jaws and the sliding shoes, the carriage and guideways being omitted for the sake of clearness; Fig. 5 is a sectional view of one of the jaw-arms taken along the line V—V in Fig. 4; Fig. 6 is a side elevation of the carriage, the same being partially broken away to show one of the slideways; Fig. 7 is an enlarged section taken along the line VII—VII in Fig. 6; Fig. 8 is an enlarged view showing the jaws as they are positioned relative to the neck of the bottle or other ware just before grasping the latter; and Fig. 9 is a similar view showing the jaws grasping ware for the take-out operation.

Referring to the drawings, 1 represents a pair of parallel rails extending horizontally over the take-off position of the fabricating machine and supported by being bolted to the parallel sides of a frame-plate 2 which is provided with the split collars 3 and 4 by means of which said frame-plate is clamped on the standards 5 and 6 of the fabricating machine.

For the sake of brevity I do not herein fully show or describe the structure of the fabricating machine, but the same will be fully understood by reference to my said patent application Serial No. 608,976.

7 is a carriage having recesses 8 in its sides which fit on the rails 1, thus slidably supporting the carriage on the rails. The recesses are closed by the side plates 9 and 10, respectively, which are bolted in place. One of the plates may be bolted fixedly in place, as in the case of the plate 9 while the other plate, 10, is preferably in resilient frictional contact with the corresponding rail. Thus 11 represents bolts screwed into threaded holes in the carriage 7 and extending through holes in side plates 10. Nuts 12 are screwed on the outer ends of the bolts compressing between themselves and the plate 10 the helical springs 13 coiled about the bolts. Thus the movement of the carriage is frictionally retarded, and the retarding effect may be regulated by adjusting the compression of the springs 13 by the nuts 12.

14 and 15 represents the two jaw arms. One of the jaw arms, such as 14, may be provided with a detachable jaw member 16. The jaws are preferably provided with an arcuate gripping edge of proper radius or curvature to fit the neck of the ware.

18 and 19 are the cross-over jaw levers whose lower ends are provided on their outer faces with spaced apart vertical flanges 20 having flared inner walls, as shown in Fig. 5, forming seats in which are contained the upper ends of the jaw arms fitting against the outer faces of the levers. Bolts 21 extend through holes in the jaw arms and are screwed into threaded holes in the levers, and the nuts 22 screwed on the threaded outer ends of the bolts compress helical springs 23, wound about the bolts, between themselves and the jaw arms.

It is thus evident that the jaw arms are normally held against movement relative to the levers in the seats defined by the flanges 20 but give resiliently in the plane of their operative movement or laterally. Thus the jaw arms grasp the ware loosely, thereby obtaining a sufficient grip thereon without danger of crushing or distorting the ware, and will also give either outwardly or laterally without breaking in case of an obstruction to their proper closing.

If desired the jaw arms may be of resilient metal to increase their yielding and they may be arranged to grasp the ware with a light resilient grip.

The levers 18 and 19 are of the cross-over type, being provided intermediate of their ends with the alined sleeves 24 and 25, respectively by means of which the levers are rotatably mounted on a pivot pin 26 whose ends extend through the shoes 27. The shoes 27 are vertically slidable in vertically depending guideways 28 which are part of the carriage 7. The guideways are preferably arcuate in cross-sectional shape, as shown in Figs. 6 and 7, as are also the shoes. The outer ends of the pin 26 extend through vertical slotted openings 29 in the outer walls of the guideways 28 and are provided with cotter pins to prevent longitudinal displacement of the pivot pin.

The lower ends of the shoes 27 are connected by the cross-bar 30 which by contact with the lower ends of the guideways 28 limits the upward movement of the shoes.

The crossed-over upper ends of the levers 18 and 19 are connected by the pairs of links 31 to the pivot-pin 32 whose ends are inserted in holes in the upper shoes 33 which are also slidable in the guideways 28.

34 is a cross head whose ends are cylindrical and journaled in holes in the upper ends of the upper shoes 33 and which is provided at its center with a transversely disposed bearing hole through which extends the pivot pin 35 which is pivotally engaged on either side by the lower ends of the twin links 36 whose upper ends are pivotally connected by the pin 37 to the lower arm of a bell-crank lever 38 pivotally mounted on a pin 39 in the carriage 7.

The upper arm of the bell-crank lever 38 is bifurcated to receive a pierced ear 40 integral with a sleeve 41, the pin 42 pivotally connecting the ear 40 with the bell-crank lever 38.

The front end of a pitman-rod 43 is inserted through the sleeve 41 and the position of the sleeve is adjusted on said rod by means of front and rear positioning nuts 44 screwed on the threaded end portion of said rod.

The rear end of the pitman rod 43 is provided with a second sleeve 45 adjustable thereon by means of the positioning nuts 46, and by means of its pierced ear 47 said sleeve is pivotally connected to one arm of a bell-crank lever 48 which is pivoted at its angle to a fixed portion of the fabricating machine, such as the standard 49. The other end of the bell-crank lever 48 is provided with a roller 50 which engages the trough track 51 of the cam 52 which is mounted on the main cam shaft 53 of the fabricating machine.

It is evident that the pitman rod 43 is reciprocated longitudinally by the rotation of the cam shaft 53.

Assuming that the carriage 7 is positioned at its inner station over the mold from which the ware is to be removed and the take-off jaws are spread and lowered and positioned to be closed together in engagement with the neck of the ware, the relative positions of the mechanism is illustrated in Fig. 8, the mold halves being indicated at 54 in dotted lines as separated as they are when the mold is opened and the jaws being positioned at either side of the neck of the ware 55. Now the initial outward movement of the pitman rod 43 in response to the rotary movement of the cam 52 will not result in moving the carriage 7 outwardly along the rails 1, owing to the frictional engagement of the spring-pressed side plate 10 with the adjacent rail, but the movement of the pitman-rod will be exerted in rocking the bell-crank lever 38 in a counterclockwise direction in Fig. 1, thus drawing upwardly the links 36, the cross-head 34 and the upper shoes 33, thereby causing the crossed-over upper ends of the levers 18 and 19 to converge, thus causing the jaws to approach and grip the ware, as shown in Fig. 9. When the ware is properly gripped by the jaws the further upward movement of the upper shoes 33 in response to the swing of the bell-crank lever 38 results in drawing the lower shoes 27 upwardly, thereby raising the jaws and their burden, the ware. This elevating movement continues until the cross-bar 30 comes into contact with the lower end of the guideways 28; whereupon the force exerted by the outward movement of the pitman rod 43 is applied directly to the carriage 7, overcoming its frictional engagement with the rail and causing the carriage 7 to move outwardly along the rails to the discharge position which is reached as the outward movement of the pitman ceases.

As the pitman rod begins its inward movement, it does not move the carriage 7, due to the frictional engagement of the carriage with the rail but the initial movement of the rod results in swinging the bell crank lever 38 in the reverse direction from that above described, thereby first lowering the jaws and the ware depending therefrom to deposit the ware on a receiver, such as a conveyor. When the descent of the shoes 27 causes the pin 26 to strike against the lower ends of the slots 29 in the guideways 28 the lower shoes 27 stop and the further lowering of the upper shoes 33 will cause the jaws to spread and release the ware.

56 represents washers which may be placed in the guideways 28 on top of the lower shoes 27, thus limiting the descent of the upper shoes and consequently the extent of the spread of the jaws as the upper shoes will halt their descent by striking against the washers. By adjusting the thickness and number of washers employed the descent of the upper shoes and therefore the spread of the jaws may be nicely adjusted to suit the particular kind of ware being taken out and to enable the open jaws to enter the open mold on the return movement.

The continued inward movement of the pitman rod results in sliding the carriage 7 inwardly, returning it to its position above the mold, with the lowered take-off jaws interposed between the mold halves and spread apart, as first above described.

It will be observed that in the embodiment illustrated herein the jaws move in a vertical plane at right angles to the plane which includes the axis of the mold bottom and the axis upon which the mold parts open and close, the jaws entering between the open mold parts into positions at either side of the neck of the ware and moving horizontally into grasping engagement with the neck of the latter. It is thus necessary to open the mold parts to a relatively slight degree only and therefore the hinge members upon which the mold parts are mounted may be relatively short, thus economizing space and metal.

It is important that the ware be vertically positioned when the take-off jaws close about the neck, or otherwise the jaws will not properly grasp the ware.

I therefore provide new and improved means for this purpose.

Thus 57 represents an angular bracket mounted on a standard 57a by means of a collar 57b and set screw 57c. 58 represents a lever pivotally connected intermediate of its ends to the bracket, the rear end of the lever being weighted, as at 59 to provide a counterbalance.

The front end of the lever is provided with a forwardly extending horizontal portion 60 having longitudinal edge flanges 61 between which fits the rear end of the cam member 62, the cam member being secured to the lever in the following manner.

63 represents a bolt which extends through a hole in the cam member and is screwed into a threaded hole in the lever. The cam member is resiliently held in place on the lever by means of a helical spring 64 coiled about the bolt between the cam member and a nut 65 which may be adjusted to regulate the power of the spring. The inner walls of the flanges 61 are inclined, as shown in connection with the similar flanges 20 of the jaw-levers in Fig. 5. Thus the cam member is resiliently held to the lever in such manner that its free end may be tilted upwardly or laterally relative to the lever in case of abnormal resistance to its normal operation, thereby preventing breakage.

The cam member 62 is provided on its lower face with a plug 66 of proper contour to fit into the upper end of the ware, said plug being detachably mounted in place, as by the bolt 67, so that a plug of the character adapted to the neck of the ware being made may be installed.

The cam member is provided with a top bar 68 which first inclined upwardly and rearwardly and then is horizontally disposed, said bar being in the path of a weighted pawl 69 pivotally suspended from an arm 70 extending rearwardly from the carriage 7. The upper end of the pawl 69 is bifurcated to straddle the arm 70 from below and the pivot pin 71 has its ends inserted into vertically slotted holes in the pawl, so that the pawl may not only swing on a horizontal axis but may be lifted upwardly relative to the pivot pin when its weight is supported from below by the top arm 68 of the cam 62.

The pawl 69 is supported on the pivot pin 71 by adjustment screws 69a which are screwed down through threaded holes in the pawl and impinge from above on the pivot pin. Thus the effective length of the pawl may be regulated by adjusting the screws 69a to suit molds of various heights.

As the carriage 7 during an inward movement approaches the mold position, the pawl 69 rides up on the bar 68 forcing the plug 66 down into the neck of the ware just before the mold opens and the plug remains so engaged while the mold opens. As the carriage reaches its innermost position, the pawl rides rearwardly off the upper portion 68 of the bar 62 and the end of the arm 70 strikes a finger 72 on the lever 58 tilting upwardly the front end of the lever and with its the cam 62, thus disengaging the plug from the ware and lifting it up out of the way.

I provide means for preventing breakage as a result of abnormal resistance by the take-off to the impulses of the pitman-rod. Thus I form the rear end of said rod in two parts 43a and 43b, the former being integral with the body of the rod and the latter being inserted into the sleeve 45 and engaged by the nuts 46. The end of the portion 43a is hollowed out axially, and exteriorly threaded to be screwed into the threaded bore of a block 73 which has a bore mating with the bore of the rod portion 43a. The end of the rod portion 43b is inserted into the bore of said block 73 and is notched to receive the end of a spring detent 74 mounted in a seat in said block. Under normal operative conditions the rod operates as a unit, the detent holding the portions in connection but in case of abnormal resistance the locking force of the detent is overcome and the rod portion 43b becomes disconnected, thus preventing wreckage.

It will be noted that the track 51 of cam 52 is symmetrical on either side of its diametric rib 75, so that the same cam may be employed on a fabricating machine operating in either a counterclockwise or a clockwise direction. It will also be noted that the track varies in rapidity of cam movement.

My improved take-out device is simple in construction and positive in its action. The ware is grasped and taken out without danger of injury or distortion thereof. In case of undue resistance to its operation the mechanism will yield and thus avoid breakage. It may be readily adjusted to various sizes and shapes of ware. The movements of its movable parts are limited in extent, thus expediting its operation and reducing the power required for operation and the possibility of wear.

It will be noted that the frame 2 may be lowered or raised on its supports, the standards 5 and 6 thus enabling the elevation of the take-out to be adjusted to suit molds of various heights. By loosening the bolts of the split collars 3 and 4 the frame plate may be slid up or down on the standards and the bolts then retightened to clamp the frame in its adjusted position. Thus the take-out is adjustable as a unitary structure. Likewise the ware positioning mechanism may be adjusted to suit various heights of molds by loosening the set screw 57c and sliding the collar 57b up or down on the standard 57a and then retightening the set screw.

What I desire to claim is:—

1. A take-out mechanism, for use in connection with a glass-fabricating machine provided with a mold from which the fabricating articles are to be removed, comprising a pair of jaw levers pivotally connected together, means for causing said jaw levers to converge and diverge a pair of opposed ware-grasping jaws, and a sliding bolt and spring connection between the jaws and the jaw levers whereby the jaws will yield in case of abnormal resistance to their operation.

2. A take-out mechanism, for use in connection with a glass-fabricating machine provided with a mold from which the fabricating articles are to be removed, comprising a pair of jaw levers pivotally connected together, means for causing said jaw levers to converge and diverge the ends of the levers being provided with seats, a pair of opposed ware-grasping jaws having portions fitting in said seats, and sliding bolt and spring connections to resiliently retain said jaws in place relative to said seats.

3. In glass-fabricating machinery, the combination with a partible fabricating mold, of take-out means for removing the ware from the opened mold, means actuated by the movement of the take-out means to hold the ware upright in the opening mold, and means whereby the holding means is disengaged from the ware when the take-out means has grasped the latter.

4. In glass-fabricating machinery, the combination with a partible fabricating mold and take-out mechanism for the removal of the ware from the parted mold, means for holding the ware upright as the mold opens comprised of a ware-engaging member mounted for vertical movement and normally held in and returned to an elevated position, and a second member moving in unison with the take-out mechanism and arranged to engage and depress the ware-engaging member into engagement with the ware as the take-out mechanism approaches its take-out position.

5. In glass-fabricating machinery, the combination with a partible fabricating mold and take-out mechanism for the removal of ware from the parted mold, of means for holding the ware upright as the mold opens comprised of a ware-engaging member mounted for vertical movement and normally held in and returned to an elevated position, and a pivotally mounted weight moving in unison with the take-out mechanism and arranged to engage and depress the ware-engaging member into engagement with the ware as the take-out mechanism approaches its take-out position.

6. In glass-fabricating machinery, the combination with a partible fabricating mold and take-out mechanism for the removal of ware from the parted mold, of means for holding the ware upright as the mold opens comprised of a ware-engaging member mounted for vertical movement and normally held in and returned to an elevated position, and a pivotally mounted weight moving in unison with the take-out mechanism and arranged to engage and temporarily depress the ware-engaging member into engagement with the ware as the take-out approaches its take-out position, said weight being arranged for vertical movement relative to its support so that it will rest upon the ware-engaging member.

7. In glass fabricating machinery, the combination with a partible mold and take-out mechanism for the removal of ware from the parted mold, of means for holding the ware upright as the mold opens comprised of a ware-engaging member mounted for vertical movement and normally held in and returned to an elevated position, and a second member moving in unison with the take-out mechanism and arranged to engage and depress the ware-engaging member into engagement with the ware as the take-out mechanism approaches its take-out position, said second member being vertically adjustable to accommodate ware of various heights.

8. In take-out mechanism for the removal of finished ware from a glass-fabricating mold, the combination of a track, a carriage arranged to be moved along the track, parallel guides depending from the carriage, an upper pair of shoes slidably mounted in the upper portions of the guides, a lower pair of shoes slidably mounted in said guides below the upper shoes, means for limiting the downward movement of the lower shoes, a pair of cross-over levers, ware-gripping jaws carried by said levers, a pivot pin for said levers, the ends of the pivot pin being received in holes in the lower shoes, links connecting the upper ends of the levers to the upper shoes, and means for periodically raising and lowering the upper shoes in said guides.

9. In take-out mechanism for the removal of finished ware from a glass-fabricating mold, the combination of a track, a carriage arranged to be moved along the track, parallel guides depending from the carriage, an upper pair of shoe slidably mounted in the upper portions of the guides, a lower pair of shoes slidably mounted in said guides below the upper shoes, means for limiting the downward movement of the lower shoes, a pair of cross-over levers, ware-gripping jaws carried by said levers, a pivot pin for said levers, the ends of the pivot pin being received in holes in the lower shoes, links connecting the upper ends of the levers to the upper shoes, an operating rod, and operative connection between the upper shoes and the rod whereby to raise and lower the upper shoes.

10. In take-out mechanism for the removal of finished ware from a glass-fabricating mold, the combination of a track, a carriage arranged to be moved along the track, parallel guides depending from the carriage, an upper pair of shoes slidably mounted in the upper portions of the guides, a lower pair of shoes slidably mounted in said guides below the upper shoes, means for limiting the downward movement of the lower shoes, a pair of cross-over levers, ware-gripping jaws carried by said levers, a pivot pin for said levers, the ends of the pivot pin being received in holes in the lower shoes, links connecting the upper ends of the levers to the upper shoes, a bell-crank lever, links connecting the upper shoes to one arm of the bell-crank lever, and an operating rod connected to the other end of the bell-crank lever whereby to raise and lower the upper shoes.

Signed at Pittsburgh, Pa., this 22nd day of April, 1926.

WILLIAM J. MILLER.